United States Patent
Ramprashad (10) Patent No.: US 10,381,020 B2
(45) Date of Patent: Aug. 13, 2019

(54) SPEECH MODEL-BASED NEURAL NETWORK-ASSISTED SIGNAL ENHANCEMENT

(71) Applicant: Apple Inc., Cupertino, CA (US)

(72) Inventor: Sean A. Ramprashad, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/625,966

(22) Filed: Jun. 16, 2017

(65) Prior Publication Data

US 2018/0366138 A1    Dec. 20, 2018

(51) Int. Cl.

| | | |
|---|---|---|
| G10L 15/20 | (2006.01) | |
| G10L 19/00 | (2013.01) | |
| G10L 25/15 | (2013.01) | |
| G10L 25/30 | (2013.01) | |
| G10L 21/003 | (2013.01) | |
| G10L 21/0208 | (2013.01) | |
| G10L 21/0232 | (2013.01) | |

(52) U.S. Cl.
CPC .............. G10L 25/30 (2013.01); G10L 15/20 (2013.01); G10L 21/003 (2013.01); G10L 21/0208 (2013.01); G10L 21/0232 (2013.01); *G10L 19/00* (2013.01); *G10L 25/15* (2013.01)

(58) Field of Classification Search
CPC ..... G10L 25/30; G10L 15/20; G10L 21/0232; G10L 25/15
See application file for complete search history.

(56) References Cited

U.S. PATENT DOCUMENTS 5,450,522 A * 9/1995 Hermansky ......... G10L 21/0208
704/200.1
5,878,389 A * 3/1999 Hermansky ......... G10L 21/0208
704/203
(Continued)

FOREIGN PATENT DOCUMENTS

WO    WO-9848407    10/1998

OTHER PUBLICATIONS

H. Hermansky, Perceptual Linear Predictive (PLP) Analysis of Speech, in J. Acoust. Soc. Am., vol. 87, No. 4, pp. 1738-1752, 1990.*
(Continued)

*Primary Examiner* — Fariba Sirjani
(74) *Attorney, Agent, or Firm* — Womble Bond Dickinson (US) LLP (57) ABSTRACT

Several embodiments of a digital speech signal enhancer are described that use an artificial neural network that produces clean speech coding parameters based on noisy speech coding parameters as its input features. A vocoder parameter generator produces the noisy speech coding parameters from a noisy speech signal. A vocoder model generator processes the clean speech coding parameters into estimated clean speech spectral magnitudes. In one embodiment, a magnitude modifier modifies an original frequency spectrum of the noisy speech signal using the estimated clean speech spectral magnitudes, to produce an enhanced frequency spectrum, and a synthesis block converts the enhanced frequency spectrum into time domain, as an output speech sequence. Other embodiments are also described.

21 Claims, 9 Drawing Sheets

(56) References Cited

U.S. PATENT DOCUMENTS

| | | | | |
|---|---|---|---|---|
| 6,009,391 | A * | 12/1999 | Asghar | G10L 15/02 704/222 |
| 7,277,550 | B1 * | 10/2007 | Avendano | G10L 21/02 381/103 |
| 7,343,284 | B1 | 3/2008 | Gazor et al. | |
| 7,603,271 | B2 * | 10/2009 | Kim | G10L 19/06 704/207 |
| 7,716,046 | B2 | 5/2010 | Nongpiur et al. | |
| 9,064,498 | B2 | 6/2015 | Uhle et al. | |
| 2005/0137863 | A1 * | 6/2005 | Jasiuk | G10L 19/09 704/222 |
| 2011/0066427 | A1 * | 3/2011 | Konchitsky | G10L 21/0208 704/219 |
| 2011/0251846 | A1 * | 10/2011 | Liu | G10L 19/025 704/500 |
| 2013/0144614 | A1 * | 6/2013 | Myllyla | G10L 19/0208 704/210 |
| 2013/0246055 | A1 * | 9/2013 | Gao | G10L 19/04 704/205 |
| 2016/0111108 | A1 * | 4/2016 | Erdogan | G10L 21/0216 704/202 |
| 2017/0323653 | A1 * | 11/2017 | Hassan al Banna | G10L 15/20 |
| 2018/0197534 | A1 * | 7/2018 | Li | G10L 15/16 |

OTHER PUBLICATIONS

"Introduction to CELP Coding", Retrieved from the Internet: https://speex.org/docs/manual/speex-manual/node9.htm, (May 23, 2007), 5 pages.

Chazan, Shlomo E., et al., "A Hybrid Approach for Speech Enhancement Using MoG Model and Neural Network Phoneme Classifier", *IEEE/ACM Transactions on Audio, Speech, and Language Processing*, vol. 24, No. 12, (Dec. 2016), 2516-2525.

Lee, Chin-Hui, "Speech Enhancement Based on Deep Neural Networks", (May 26, 2014), 25 pages.

Ramachandran, Ravi P., et al., "Pitch Prediction Filters in Speech Coding", *IEEE Transactions on Acoustics, Speech, and Signal Processing*, vol. 37, No. 4, (Apr. 1989), 467-478.

* cited by examiner

SPEECH MODEL-BASED NEURAL NETWORK-ASSISTED SIGNAL ENHANCEMENT

FIELD

An embodiment of the invention relates to digital signal processing techniques that can enhance a noisy speech signal so as to improve its automatic speech recognition word error rate, or improve its human listening experience.

BACKGROUND

Digital signal processing techniques are available that pre-process a noisy speech signal to improve the quality of the speech therein. The pre-processed speech signal would sound less noisy to a person listening (by virtue of having better sound quality or being more intelligible.) Alternatively, an automatic speech recognition (ASR) process operating upon the pre-processed signal would have a lower word error rate. Speech signal enhancement techniques include those that are based on using a Deep Neural Network (DNN) to produce the enhanced speech signal. Configuring a DNN processor (enabling it to learn) is a big task, both computationally heavy and time intensive. For example, the input "features" of a conventional DNN processor can be a dozen audio frames (e.g., up to 50 milliseconds each) that are behind, and a dozen audio frames that are ahead, of a middle audio frame (part of the input or noisy speech signal.) The input feature for each frame can be of very high length (large dimension). Often this input feature has little or no structure, with the prevailing thought being that a sufficiently large or complex DNN will extract from this feature the patterns and information it needs. The input features, over multiple audio frames, are processed by a previously trained, DNN processor, to produce a single output or target frame. The target frame is a prediction or estimate of the large-dimension feature of the clean speech that is in the input noisy speech signal, based on the large-dimension input features contained in a number of earlier in time input frames and a number of later in time input frame. It is however difficult to visualize what the DNN processor is doing with such a huge amount of information, and so a more intuitive solution is desirable that is also more computationally efficient.

SUMMARY

In a DNN-based speech enhancement process, not all of the information that is in a typical, time-domain or frequency-domain audio input feature is important. One example is the spectral magnitudes of a Short-Term Fourier Transform (STFT) which has as many values as in the original time domain speech signal. Thus, even over a 100 or 200 milliseconds interval of input speech there are many hundreds of such values. Conventional thinking suggests that is acceptable to present the DNN with hundreds of such values; the DNN should figure out the underlying important information. However, this often means that the DNNs have to be large and complex. Moreover, with such large features and complex DNNs there may also be hidden underlying information or accuracy requirements for the DNN, in particular when such requirements relate back to perceptual or other principles that exist outside of the conventional measures used by the DNN, like entropy or mean-square errors. It may be therefore be useful to first understand the nature of the speech signal, and the requirements it may have. To that end, it is recognized that clean speech can be modeled and encoded successfully, at very low rates, e.g., 8 kbits/sec or less, using vocoder (speech coding) parameters, such as linear predictive coding (LPC) parameters, which themselves can be mapped to a number of proven and perceptually relevant domains such as Log Area Ratio coefficients (LARs) or Line Spectral Frequencies (LSFs). The LPC parameters including their mappings in LAR and LSF domains, model the production of speech, and their accuracy requirements as they relate to the production of high-quality speech are understood. They can therefore be relied upon to define the accuracies needed by a DNN-based speech enhancement process. In addition, such parameters naturally compress the information into a few parameters. So, rather than having many hundred values, there may be only many tens of values as the input features to a DNN. Thus, they are an order of magnitude less complex than the conventional approaches described above. In addition, each vocoding parameter value can be represented by much fewer bits, than a real-valued spectral magnitude. Thus, the information rate of such features is much lower (fewer bits needed to represent them) than the raw bitrate that is needed by a typical, magnitude spectral domain representation of an input speech signal (even ignoring phase information.)

An embodiment of the invention is an artificial neural network-based speech enhancement process in which the feature inputs to the neural network processor are speech-coding (speech synthesis) parameters that have been derived from a noisy input speech sequence by a vocoder parameter generator. Such parameters, with the addition of some less critical information, can be used to synthesize speech, though the parameters derived from noisy speech would in general synthesize noisy speech itself.

The neural network processor is configured (has been trained) to generate its output or target frames, which may be estimates of the corresponding synthesis parameters of clean speech. In training, the neural network may have ideal targets estimated from clean-speech coding/synthesis parameters. The parameters may be for example short term and long term, linear predictive coding (LPC) parameters, LARs, LSFs, and autocorrelation coefficients. This is in contrast to a neural network processor whose input and output are discrete-time sequences of speech signals, or their frequency domain equivalents like STFT magnitudes. The approach drastically reduces the amount or complexity of the information being modeled by the neural network especially as compared to models that are based on using short-term Fourier transform (STFT) magnitudes directly. As a result, this neural network based speech signal enhancement process can be deployed in a wider variety of products. In addition, accuracy requirements of the neural network outputs are well understood, matching those known for the synthesis parameters. Moreover, the approaches described here may produce an enhanced speech signal that results in lower word error rates when it is processed by a subsequent automatic speech recognizer (ASR). In other embodiments, the enhanced speech signal may be further "tuned" to improve the quality of the speech it contains, as perceived by a human listener (in comparison with an enhanced speech signal that may be suitable for ASR but not for human listening).

The vocoder may be similar to ones used in the analysis stage of speech coding. For example, the vocoder may implement a linear predictive model in which a time-varying model for formant and pitch information (coarse and fine spectral information, also referred to here as short term and long term parameters) is used.

The neural network produces "enhanced" parameters (also referred to here as clean speech estimated parameters or clean parameters) that are designed to match those of the underlying clean speech (more closely than the parameters derived directly from the noisy speech signal by the vocoder parameter generator.) The enhanced parameters are then used to derive enhanced models of formant information (and in some cases also pitch information), which may for example describe or define the formant filter and the pitch filter of an LPC speech production model. This can also be followed by computing the spectral magnitudes of the frequency response of the formant filter. These spectral magnitudes (also referred to here as "enhanced" spectral magnitudes) are then applied, by a magnitude modification block, to adjust the magnitudes of the frequency domain version of the input noisy speech signal. Thus, rather than having the neural network generate the enhanced magnitudes of the frequency domain version of the input noisy speech signal directly, it generates parameters related to the underlying structure of speech, such as formant shapes. Outside of the neural network, and by signal processing techniques, these shapes can then be applied to generate enhanced spectral magnitudes.

In one embodiment, the feature inputs to and the target outputs from the neural network include both short term and long-term linear predictive parameters such as pitch, pitch delay, and pitch voicing strength. More generally however, the process may simply rely on only short-term parameters such as LPC coefficients, LARs or LSFs. These parameters provide a very compact representation of the most important features of speech. Thus, in one embodiment, the vocoder parameter generation block and its corresponding vocoder model generation block provide (and expect) both short-term and long-term parameters. In another embodiment however, only short-term parameters (formant) are input to the DNN, and only corresponding short-term parameters are predicted by the DNN and used to produce the enhanced spectral magnitudes.

In a further embodiment, in addition to using the formant and pitch information, information related to modeling the more random portions of speech excitation are also considered, e.g., they are modeled by the neural network processor. To keep the complexity of the neural network processor low, only partial modeling or implicit modeling may be used.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Several embodiments of the invention with reference to the appended drawings are now explained. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
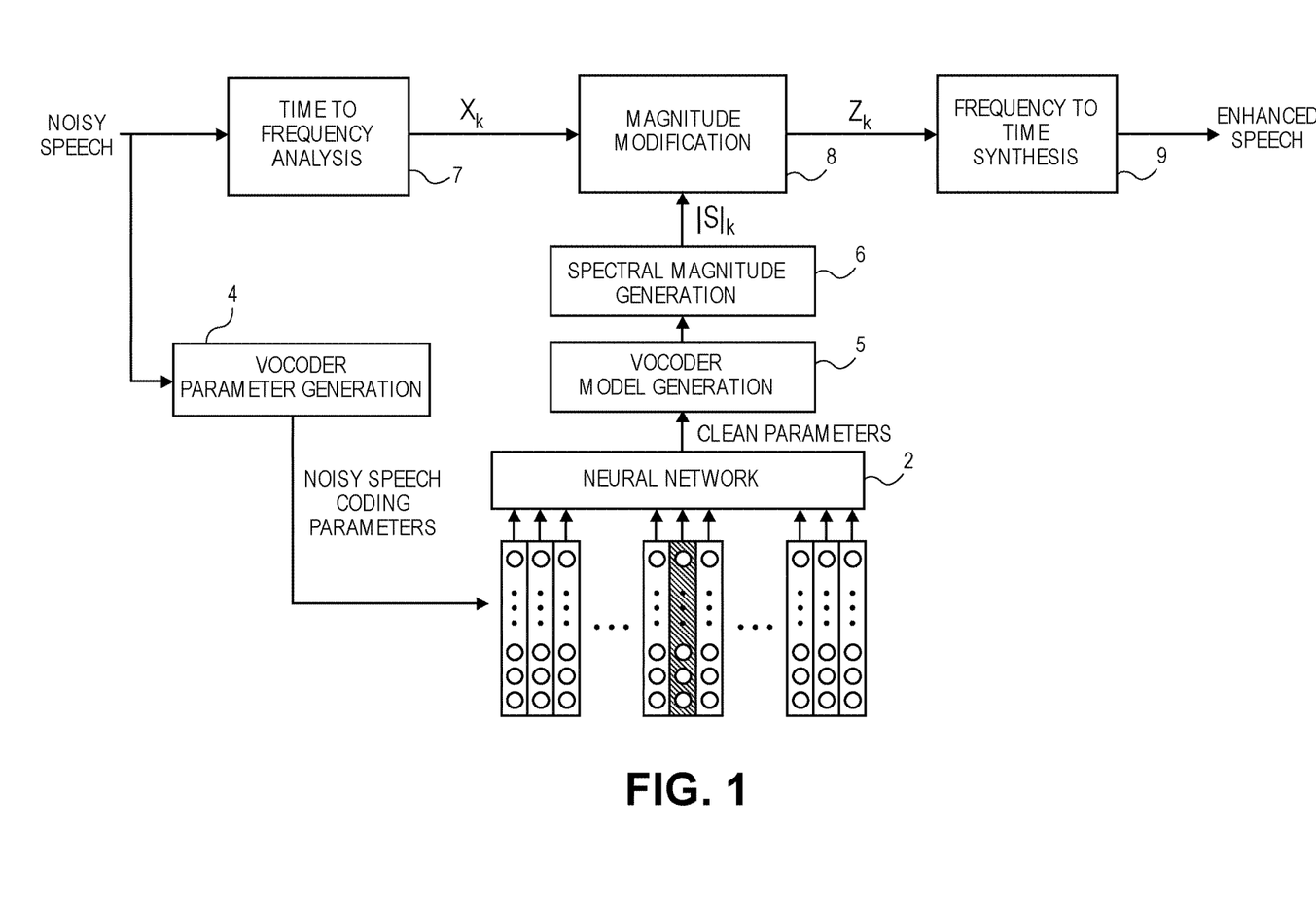
FIG. 1 is a block diagram of an example digital speech signal enhancer.

FIG. 1 is a block diagram of a digital speech signal enhancer in accordance with an embodiment of the invention. The block diagrams here depict not just the digital electronic hardware components that constitute the speech signal enhancer, such as memory that contains instructions to be executed by a processor, but also operations of a method or process for speech signal enhancement; such a method or process may be performed by the electronic hardware components that are shown, or they may be performed by a different arrangement or combination of hardware components. An input to the speech signal enhancer is a noisy speech signal (e.g., produced by any suitable speech pickup mechanism) that is given in digital or discrete time form, also referred to as an input speech sequence. The input speech sequence, and also the output speech sequence that contains enhanced speech, may each be an audio frame, e.g., 10 milliseconds-20 milliseconds long, for each production of clean parameters by a neural network 2 (described further below.) It has an original frequency spectrum $X_k$ that is produced by performing a time to frequency analysis (time to frequency analysis 7) upon it, where k is the index of that block of data or audio frame. A magnitude modifier (magnitude modification 8) is configured to modify the original frequency spectrum $X_k$ using what are referred to here as estimated clean (enhanced) speech spectral magnitudes $|S|_k$, to provide an enhanced frequency spectrum $Z_k$. A frequency to time domain synthesis block (frequency to time synthesis 9) converts Zk into time domain, as the output speech sequence (also referred to in the drawings as enhanced speech).

In one embodiment, the time to frequency analysis and synthesis model may be implemented using a short time Fourier transform (STFT), although other time to frequency transforms that can determine the sinusoidal frequency and phase content of local sections (frames) of a signal as it changes over time are possible, such as the modified discrete cosine transform (MDCT.) The STFT based model that is depicted in FIG. 1 and that is also used in other embodiments described later below may be viewed as deriving each chunk or frame of the noisy speech signal in the frequency domain, for example every y milliseconds, where y refers to the hop-size of the STFT. The hop-size may be a few milliseconds, e.g., five milliseconds, or up to one-half the length of the selected STFT window that is being used. The STFT window may be for example at least 20 milliseconds in order to effectively model the spectral shape of human speech. Each block or hop in the STFT is indexed by k as shown in the diagrams here, so that in general the frequency spectrum is given as Xk. However, in some instances the subscript k may be dropped for simplicity in the description below. It should be noted that such STFT values are not inputs and outputs of the neural network 2 (as also described below.)

To enhance the speech signal, the magnitude modification 8 is provided with specially generated spectral magnitudes |S|k, produced by a spectral magnitude generation block (also referred to as spectral magnitude generation 6.) The |S|k serve to guide the modification of the spectral magnitudes Xk of the input speech sequence, that is done by the magnitude modification 8 in accordance with conventional techniques. For example, the spectral magnitude generation 6 may have a conventional, Wiener-like form such that its output is given by $$Zk=|S|k*Xk/|Xk|$$ Eq. 1 and therefore has the noisy phase of the input sequence Xk (and the enhanced magnitudes |S|k.) Other approaches to produce Zk are possible.

In accordance with an embodiment of the invention, the magnitude modification 8 is indirectly driven by so-called "clean" parameters, also referred to here as estimated clean speech coding or synthesis parameters, that are produced by a neural network processor (neural network 2) as its output or target frame. The output or target frame is produced on a per frame basis, or more frequently. The neural network 2 implements for example a deep neural network (artificial neural network) algorithm that has been trained to produce estimates of speech coding parameters that encode/synthesize the clean speech that would be found in the input features of the neural network 2. The input features are noisy speech coding/synthesis parameters that have been derived from the input speech sequence by a vocoder parameter generation block (vocoder parameter generation 4.) The parameters may be derived for every input audio frame.

Figure 2:
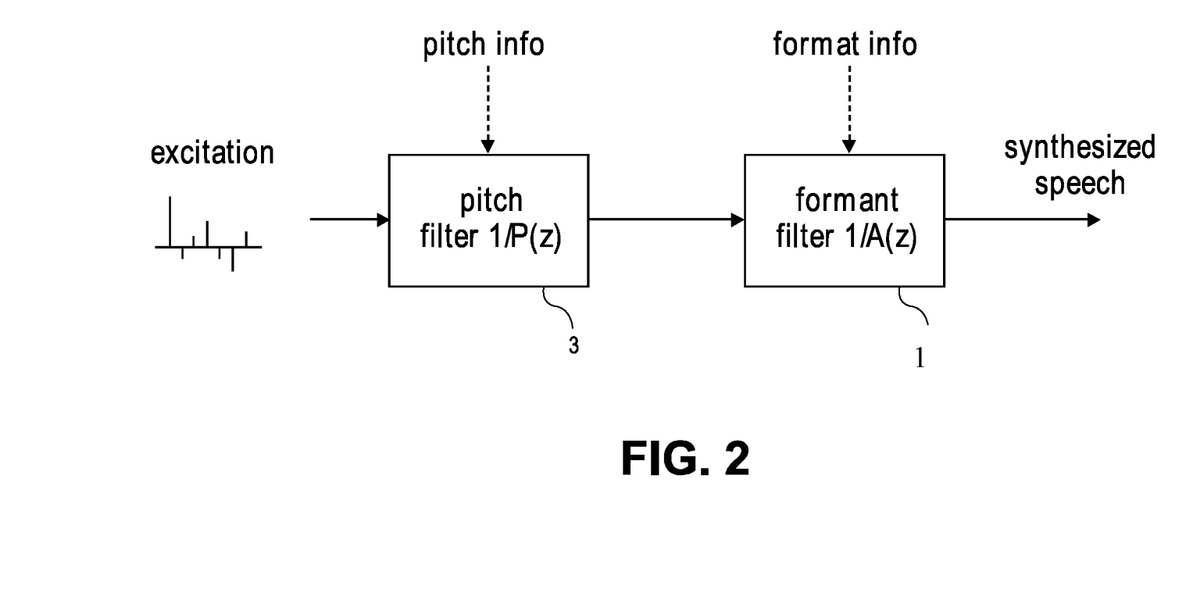
FIG. 2 depicts an example speech production model (speech synthesis stage) that is based on an excitation driving linear time-varying filters that include short term and long-term linear predictive parameters.

Still referring to FIG. 1, the vocoder parameter generation 4 encodes the input noisy speech signal using a selected speech production model, to produce speech coding parameters that are the input features of the neural network 2. In one embodiment, the speech coding parameters are linear predictive coding (LPC) parameters that are in accordance with a linear predictive model of speech production, as shown in FIG. 2. In this model, there is a cascade connection of two adaptive filters, a pitch filter 3 and a formant filter 1, which are linear but time-varying filters that are driven by an excitation, to produce a synthesized speech signal as output. These linear filters model both coarse and fine spectral structure, or short-term and long-term correlations, or formants and pitch, respectively, of human speech. Note here that the excitation may include considerations for phase, voicing, and features that may not be efficiently represented by the linear pitch and formant filters—this aspect of the speech production model is considered in another embodiment of the invention described below.

In one embodiment, the speech coding parameters result from a conventional speech encoding process (performed by vocoder parameter generation 4) that produces typical digital filter taps or digital filter coefficients (that may directly define the formant and pitch filters.) In another embodiment, the parameters that are input to the neural network 2 are not just filter coefficients but instead they are more appropriate for quantization and for modeling by the neural network. For example, a digital filter can be split into gain and "pole" / "zero"-like information. The "poles" of an IIR filter for speech processing may be described in forms like Line Spectral Pairs or Line Spectral Frequencies (LSFs.) The LSPs may be thought of as the roots of the polynomial that is defined by the LPC coefficients, as a way to quantize the LPC information (and there are conventional mappings that can be used to convert from LPC coefficients to LSPs.) Such forms are more appropriate for modeling the underlying filters, and are used in quantization where the L2 (square error) norm (or some weighted L2 norm) helps to appropriately guide quantization. Another useful domain for parameterizing the formant information of the noisy speech input, as input to the neural network 2, is Log Area Ratios (LARs). Whatever the selected parameters that are input to the neural network, they may have had additional mean or variance normalization performed upon them. In any case, the target frame produced by the neural network 2 contains "estimated clean speech" coding parameters (also referred to here as enhanced parameters or clean parameters), which are parameters that may be viewed as estimating the encoding of a clean speech signal (if the clean speech could be separated from the noisy speech signal.)

Figure 4:
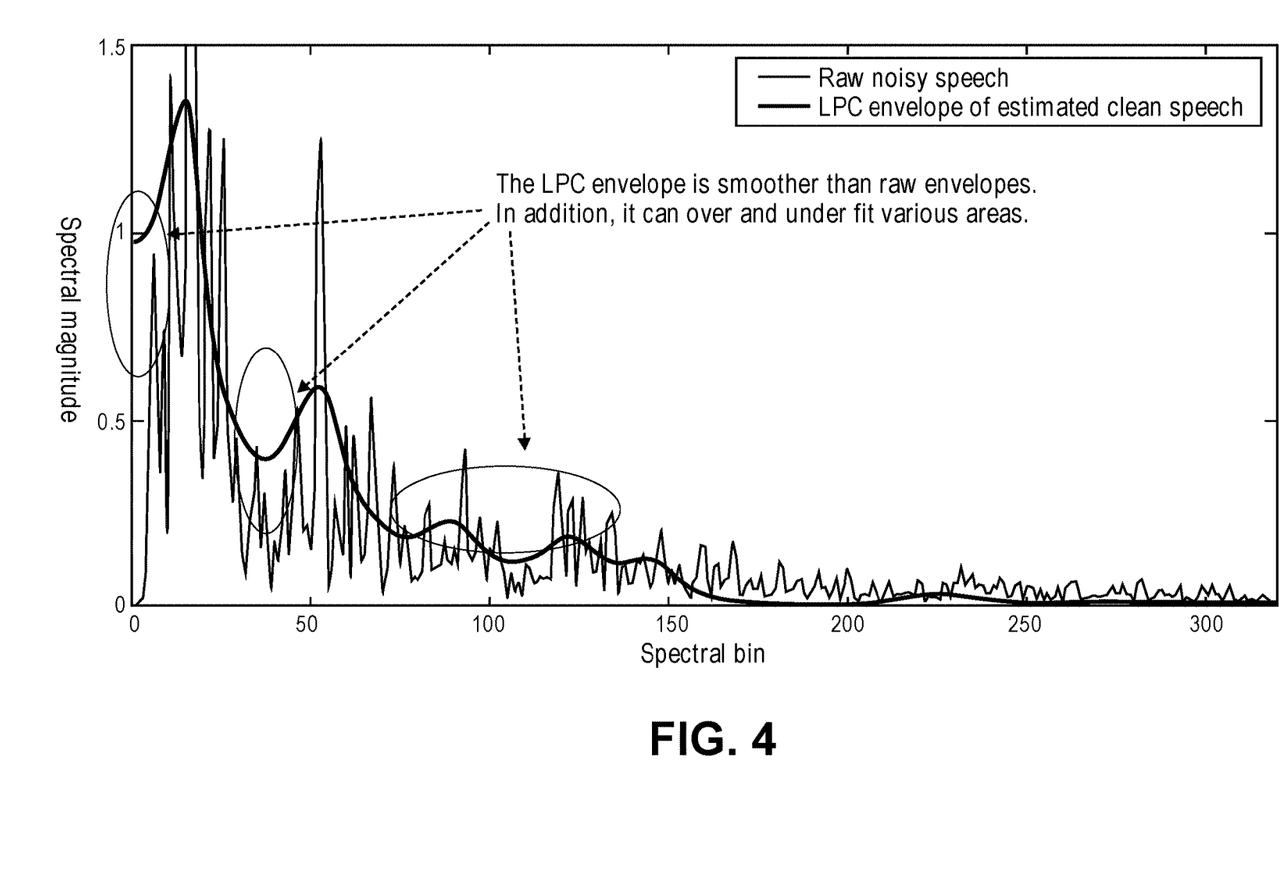
FIG. 4 is a graph of an example raw noisy speech signal depicted in frequency domain, overlaid with an LPC envelope of estimated clean speech produced by an embodiment of the invention.

The estimated clean speech parameters are provided to a vocoder model generation block (vocoder model generation 5.) The latter complements the vocoder parameter generation 4 in that it uses the same speech production model, but in reverse: in the case of an LPC model, the vocoder model generation 5 processes or decodes the clean parameters into at least short-term or formant information that defines or describes at least a formant filter 1 (see FIG. 2), in terms of its digital filter coefficients. A spectral magnitude generator (spectral magnitude generation 6) may then use that information to compute a spectral envelope of the frequency response or transfer function of the formant filter 1. FIG. 4 shows how a raw noisy speech signal is "followed" fairly closely by the estimated clean speech in the form of an LPC envelope that may be produced by the vocoder model generation 5. The graph in FIG. 4 shows that the formant information alone, which leads to the LPC envelope being much smoother or less detailed than the raw noisy envelope, can be used to model the general coarse shape of the clean speech. The smooth envelope may be computed by interpolating between a set of for example 16 to 20 numbers that are produced by the vocoder model generation 5. This approach of relying upon a speech production model to reduce the complexity of the input features to the neural network 2 allows a human designer of the speech signal enhancer here to clearly define or focus on what information is important to be enhanced by the neural network 2, thereby leading to an enhanced speech signal that is in line with what is recognized in the speech production mechanism. This may be achieved because the neural network 2 has become less complex. As an example, the speech coding model of FIG. 2 may have parameters that define formant information for the formant filter 3 consisting of only sixteen to twenty numbers (in each output or target frame of the neural network 2.)

Figure 5:
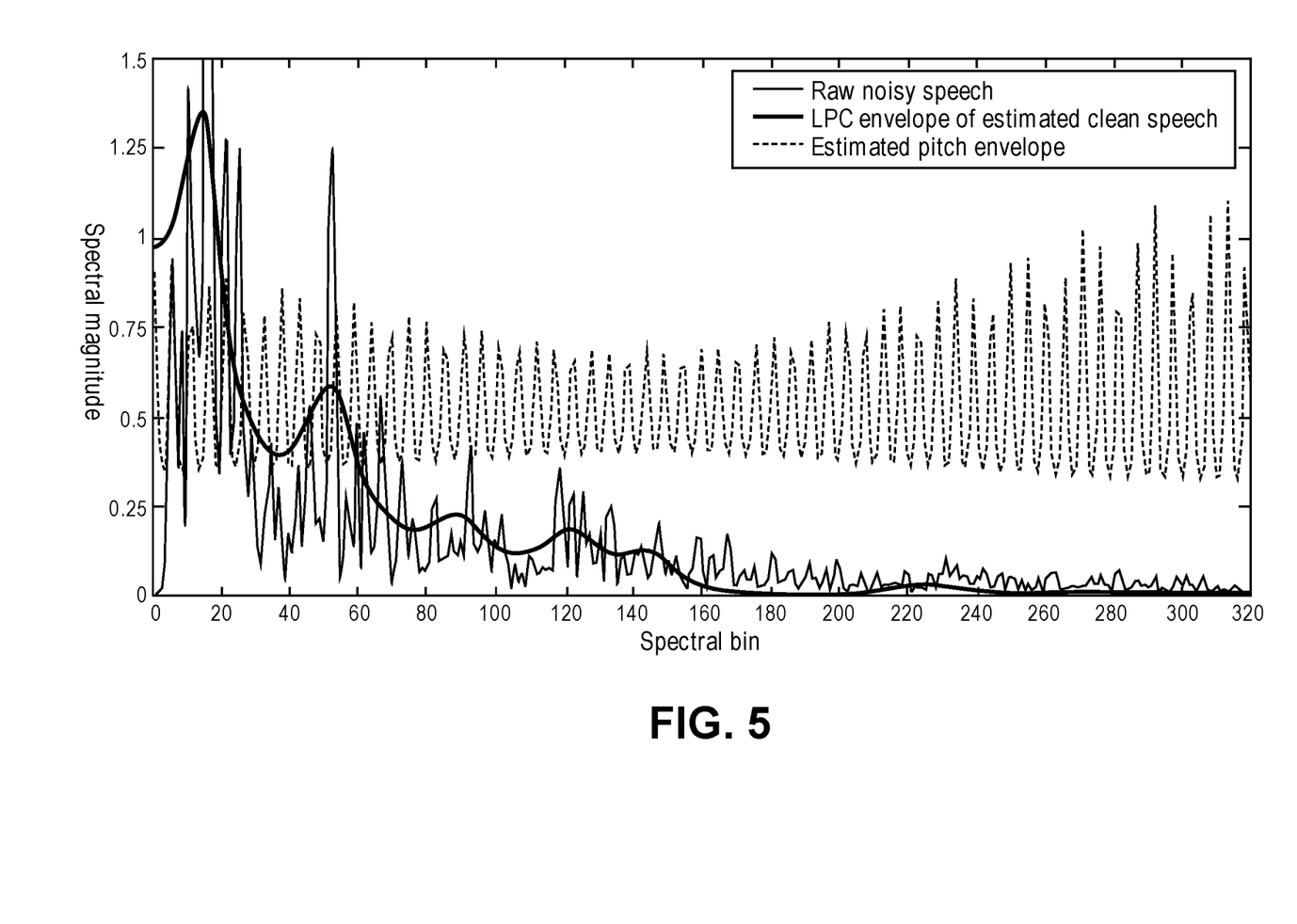
FIG. 5 is a graph of the raw noisy speech signal and the LPC envelope of the estimated clean speech of FIG. 4, overlaid with an estimated pitch envelope.
Figure 6:
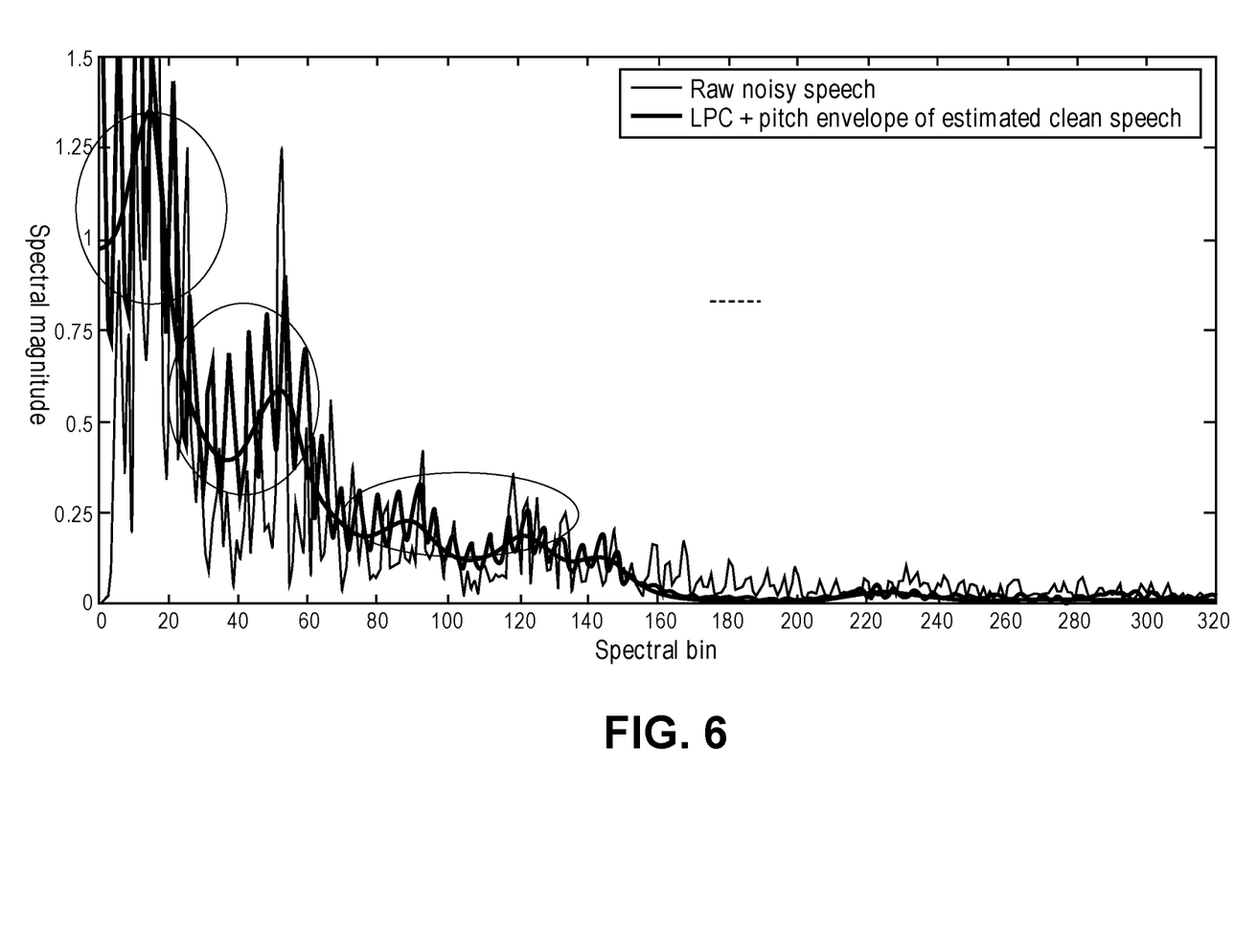
FIG. 6 is a graph of the example raw noisy speech of FIG. 4 overlaid with a combined LPC and pitch envelope of the estimated clean speech.

To achieve a finer shape in the estimate for the clean speech, pitch information may be added into the speech coding parameters (that are fed to and produced by the neural network 2.) This makes the neural network 2 more complex but yields an improved estimate of the clean speech. Thus, referring back to FIG. 1, the spectral magnitude generation 6 will receive both formant and pitch information from the vocoder model generation 5, and translates it into the frequency response of a cascade of the pitch filter 3 and the formant filter 1 (FIG. 2). The estimated clean speech spectrum magnitudes $|S|k_k$ produced by the spectral magnitude generation 6 in that case have more detail, because of the estimated pitch envelope—see FIG. 5. In other words, in this embodiment, the vocoder model generation 5 processes the estimated clean speech coding parameters are produced by the neural network processor 2, into formant and pitch information, which defines the formant filter 1 (for short-term prediction) and the pitch filter 3 (for long-term prediction). This formant and pitch information is then used by the spectral magnitude generation 6 to compute a spectral envelope of the frequency response or transfer function of a cascade of the pitch filter 3 and the formant filter 1 (FIG. 2). An example of such a spectral envelope is shown in FIG. 6 (labeled as an LPC and pitch envelope of the estimated clean speech.) It can be seen from FIG. 6 that adding this pitch information allows the system to model the fine spectral structure on top of the coarse spectral structure, where FIG. 5 shows the fine spectral structure as the estimated pitch envelope, and the coarse spectral structure as the LPC envelope.

Note that the pitch and formant filters defined by the pitch and formant information produced by the vocoder model generation 5 are time varying filters, in that their transfer function will vary in time. For example, the filters can vary on time scales as short as a few milliseconds (they are updated every few milliseconds), because the neural network 2 produces a new target or output frame (that is full of clean speech coding parameters) every few milliseconds. In contrast, an effective STFT (performed by the time to frequency analysis 7 and relied upon by the magnitude modification 6 and the frequency to time synthesis 9) may use a time scale on the order of twenty or more milliseconds. Furthermore, the pitch and formant filters generated by the vocoder model generation 5 may have irrational forms such as a mixed infinite impulse response/finite impulse response structure which may have to be conditioned because a direct derived infinite impulse response (IIR) structure may be susceptible to overfitting and underfitting a target spectral envelope.

Figure 3:
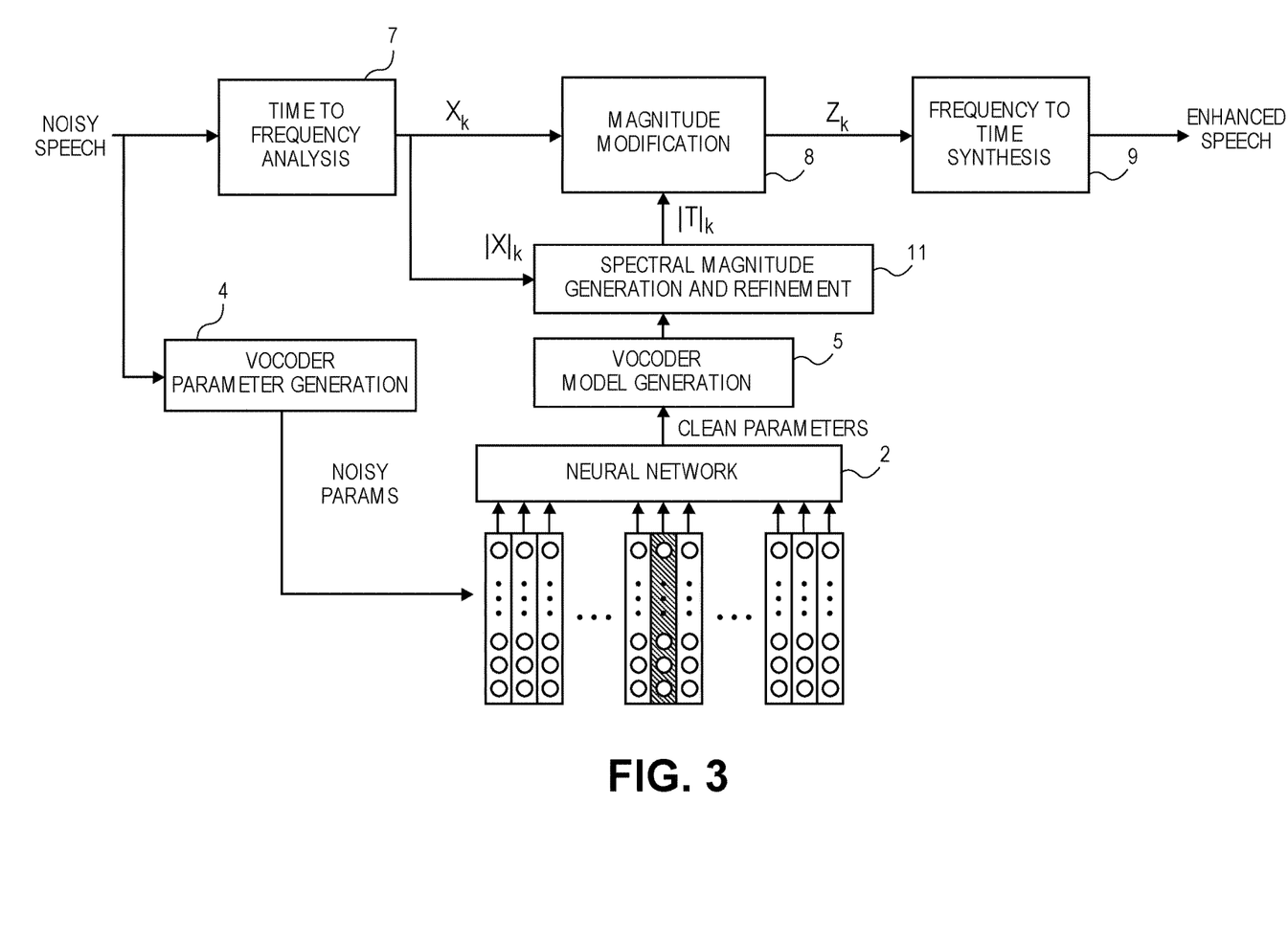
FIG. 3 illustrates an example of a variation, of the embodiment of FIG. 1, which produces refined spectral magnitudes.

The embodiment of FIG. 1 introduced the advantageous concept of a neural network 2 predicting clean speech coding parameters (e.g., less than a dozen numbers per frame), rather than the enhanced spectral magnitudes $|S|k$ directly which can require hundreds of numbers per frame. In other words, the neural network 2 rather than directly predicting the spectral magnitudes $|S|k$, that will be used to modify the $X_k$, operates to predict much fewer numbers that are nevertheless representative of the speech production model. These clean parameters are then used to derive the spectral magnitudes $|S|k$, which in turn are used to modify the original frequency spectrum Xk of the noisy speech. A variation to such a general approach is depicted in FIG. 3, wherein the spectral magnitude generation 6 has been changed into spectral magnitude generation and refinement 11 in which the original frequency spectrum of the input speech sequence, e.g., the spectral magnitudes $|X|k$, are now evaluated when processing the formant information, pitch information, or both (that was derived by the vocoder model generation 5 from the clean parameters in a target frame produced by the neural network 2), into the estimated clean speech spectral magnitudes, so as to now produce "refined" estimated clean speech spectral magnitudes $|T|k$. Note that the original frequency spectrum including its spectral magnitudes $|X|K$ is not considered by the neural network 2.

A motivation for the spectral magnitude generation and refinement 11 is that the $|S|k$ may contain features that are not consistent with $|X|k$. For example, the $|S|k$ may tend to over or under model spectral peaks and valleys. Three such regions are highlighted in FIG. 4 and in FIG. 6, by three ovals, respectively. A consistency matcher is thus needed: for example, if there is a trough in the noisy speech spectrum, then there should be a trough in the predicted clean speech spectrum.

In one embodiment, the spectral magnitude generation and refinement 11 evaluates the original frequency spectrum of the input speech sequence by comparing a spectral valley in the original frequency spectrum to a spectral valley in the estimated clean speech spectral magnitudes. Such comparisons may include computing a norm, e.g., L1, L2, L0.5, and distortion metrics, e.g., log-spectral. It then scales the spectral valley in the estimated clean speech spectral magnitudes in accordance with the comparison, when producing the refined clean speech spectral magnitudes $|T|k$. This refinement may be given by a gain vector in which a modified frequency bin j is a scaled version of the frequency bin j of $|S|k$, or in other words $$|T|k(j) = \text{gain}k(j) * |S|k(j) \qquad \text{Eq. 2}$$

The spectral magnitude generation and refinement 11 may also perform a similar modification involving spectral peaks: it evaluates the original frequency spectrum of the input speech sequence by comparing a spectral peak in the original frequency spectrum to a spectral peak in the estimated clean speech spectral magnitudes, and scales the spectral peak in the estimated clean speech spectral magnitudes in accordance with the comparison, when producing the refined clean speech spectral magnitudes $|T|k$.

The following four cases are examples of the refinement that may be performed, when comparing noisy speech to the neural network-predicted LPC envelope of the clean speech, and to the neural network-predicted pitch filter response.

Case 1: If there is a dip in the spectrum of noisy speech, it is unlikely that there is a bump in the clean speech (based on the understanding that additive noise usually creates a peak, not a trough); from this one can infer that if the raw neural network-predicted LPC envelope (presumably representing clean speech) does not dip as much, in a given set of one or more adjacent frequency bins, as a dip in or other behavior of the noisy speech, or in other words stays higher than the noisy speech in the given frequency bins, then the raw neural network-predicted LPC envelope is likely overestimating in that bin. A downward magnitude correction should be made in that case, to the affected frequency bins (derived from the neural network-predicted result.)

Case 2: If there is a peak in the noisy speech spectrum, and if the LPC envelope is also peaking in that bin, then it is possible that the LPC envelope is estimating properly (or it is not over-estimating) in that bin. No correction need be made in this case.

Case 3: Consider the pitch envelope (frequency response of a pitch filter 3), when harmonics are exhibited and are multiplied by the LPC envelope; analysis of a comparison between this combined result (representing clean speech) and the noisy speech confirms that it is unlikely that adding noise to speech would remove peaks from the speech. This reasoning can be extended as follows: if the neural network-predicted LPC+pitch envelope dips in a given frequency bin in which the noisy speech is peaking, the neural network prediction is under-estimating. An upward correction should be made in that case.

Case 4: Where there are pitch peaks in the noisy speech and in the raw neural network-predicted envelope (that includes the pitch response), which are "close" to each other but do not align or are not sufficiently correlated, then that peak in the raw, neural network-predicted envelope is removed. In other words, only if there is sufficient correlation in frequency and magnitude between a pair of "close" and "smaller" pitch peaks, is the raw neural network-predicted pitch peak kept.

Thus, by comparing the noisy speech to the raw neural network-predicted clean speech, looking for such presumed inconsistencies or unlikely scenarios, and also presumed consistencies or likely scenarios, the raw neural network-predicted clean speech parameters can be refined, by the spectral magnitude generation and refinement 11, to result in an improved prediction. This refinement relies upon a correction gain that should be derived by a process that ensures smoothness in the gain change, over frequency (smooth as a function of j). Also, while the correction gain can be applied to |S|k as per Eq. 2 above to produce |T|k, and then to produce |Z|k for example using Eq. 1, an alternative is to derive the correction gain so that it can be applied to Xk to directly produce Zk.

Figure 7:
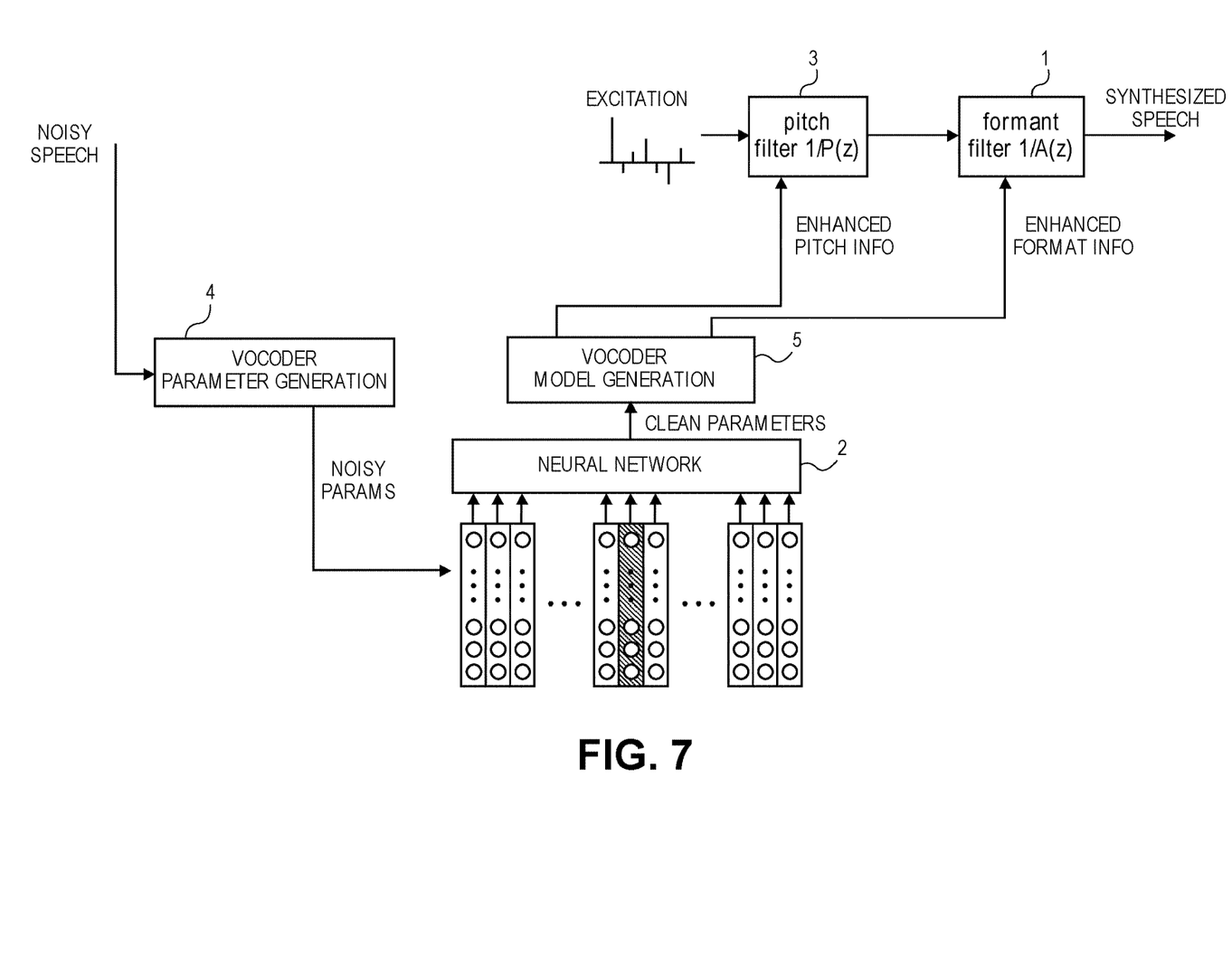
FIG. 7 shows a block diagram of another embodiment of the digital speech signal enhancer.

Turning now to FIG. 7, this is a block diagram illustrating another embodiment of the digital speech signal enhancer which does not rely on a generation model using frequency to time synthesis. This embodiment has some similarity with that of FIG. 1 in that the neural network 2 processes noisy, speech coding parameters that have been derived (by the vocoder parameter generation 4) from the input speech sequence (noisy speech), to produce clean, speech coding parameters. There is also the vocoder model generation 6, which processes the clean, speech coding parameters into enhanced formant information and enhanced pitch information. Where this embodiment differs is that the enhanced output speech signal is actually synthesized by the cascade of the pitch filter 3 (configured in accordance with the enhanced pitch information) and the formant filter 1 (configured in accordance with the enhanced formant information), which together filter an input excitation signal to produce a synthesized speech signal. In other words, the output, "enhanced" speech here is not a spectral magnitude modification of the noisy speech, but rather it is speech that has been synthesized, in accordance with a linear predictive speech production model (represented by the pitch filter 3 and the formant filter 1.) This approach produces cleaner speech, e.g., more "crisp" sounding, since it takes advantage of the time-varying aspects in the speech, and may be better suited for achieving reduced word error rate during ASR (rather than human listening.)

Figure 8:
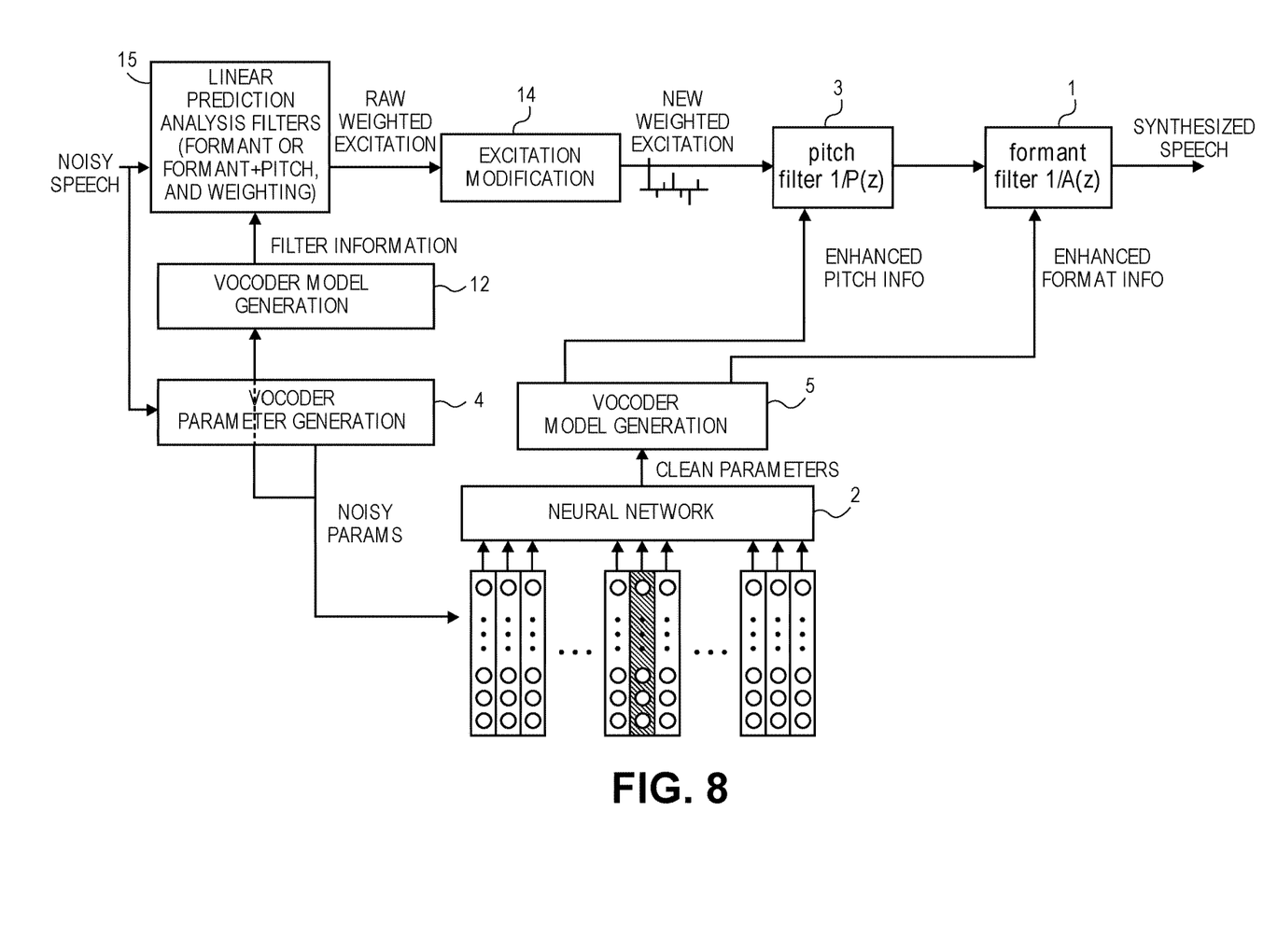
FIG. 8 illustrates an example of how to generate an excitation signal, to the pitch and formant filters of the embodiment of FIG. 7.

In one embodiment, the excitation signal in the embodiment of FIG. 7 may be any conventional excitation signal that is input to the speech production model of FIG. 2, e.g., a sequence of pulses of different amplitudes. In another embodiment, the excitation signal is produced as an enhanced excitation signal, referred to as a "raw weighted excitation" in FIG. 8, that may result in the synthesized speech sounding closer to more natural speech. A vocoder model generation 12 derives a) formant information, or formant and pitch information, and b) perceptual weighting information, from the input speech sequence (noisy speech), via the noisy parameters that were produced by the vocoder parameter generation 4. The vocoder model generation 12 may use the same linear predictive model of speech production as the vocoder parameter generation 4 and the vocoder model generation 5. Linear prediction analysis filters 15 are provided to filter the input speech sequence, by for example an inverse formant filter (not shown), or by both inverse pitch and inverse formant filters (not shown), and a weighting filter (not shown), to produce a perceptually weighted and noisy excitation signal ("raw weighted excitation", as indicated in FIG. 8.) The linear prediction analysis filters 15 are configured in accordance with the formant information, or the formant and pitch information, and in accordance with the perceptual weighting information that have been provided by the vocoder model generation 12. The process to do this is well-understood by those familiar with the state of the art in speech coding.

In a further variation of the embodiment of the FIG. 7, also depicted in FIG. 8, an excitation modification 14 is added following the linear prediction analysis filters 15, which i) transform the perceptually weighted excitation signal (raw weighted excitation) from time domain to frequency domain, ii) modify spectral magnitudes of the perceptually weighted excitation signal in the frequency domain, in accordance with the information from the vocoder model generation 12, to produce a "new weighted excitation" signal, and then iii) inverse transform the new weighted excitation signal from frequency domain to time domain. The new weighted excitation (in time domain) becomes the input to the pitch filter 3 and the formant filter 1, as shown in FIG. 8. The excitation modification 14, and in particular its spectral modification portion, thus serves to "clean up" the raw weighted excitation, by for example selecting only the dominant pulses therein (as a nonlinear operation), de-noising using wavelets, or Wiener filtering.

A further embodiment of FIG. 8 would include using the enhanced information (enhanced pitch and enhanced formant information) from the vocoder model generation 5 as an input to the excitation modification 14. In one embodiment the pitch information can be used to predict the expected spacing of dominant pulses in the Raw Weighted Excitation. Pulses that do not conform to the spacing predicted by the underlying "Enhanced Pitch" may be suppressed by scaling with a gain factor less than 1.0.

Figure 9:
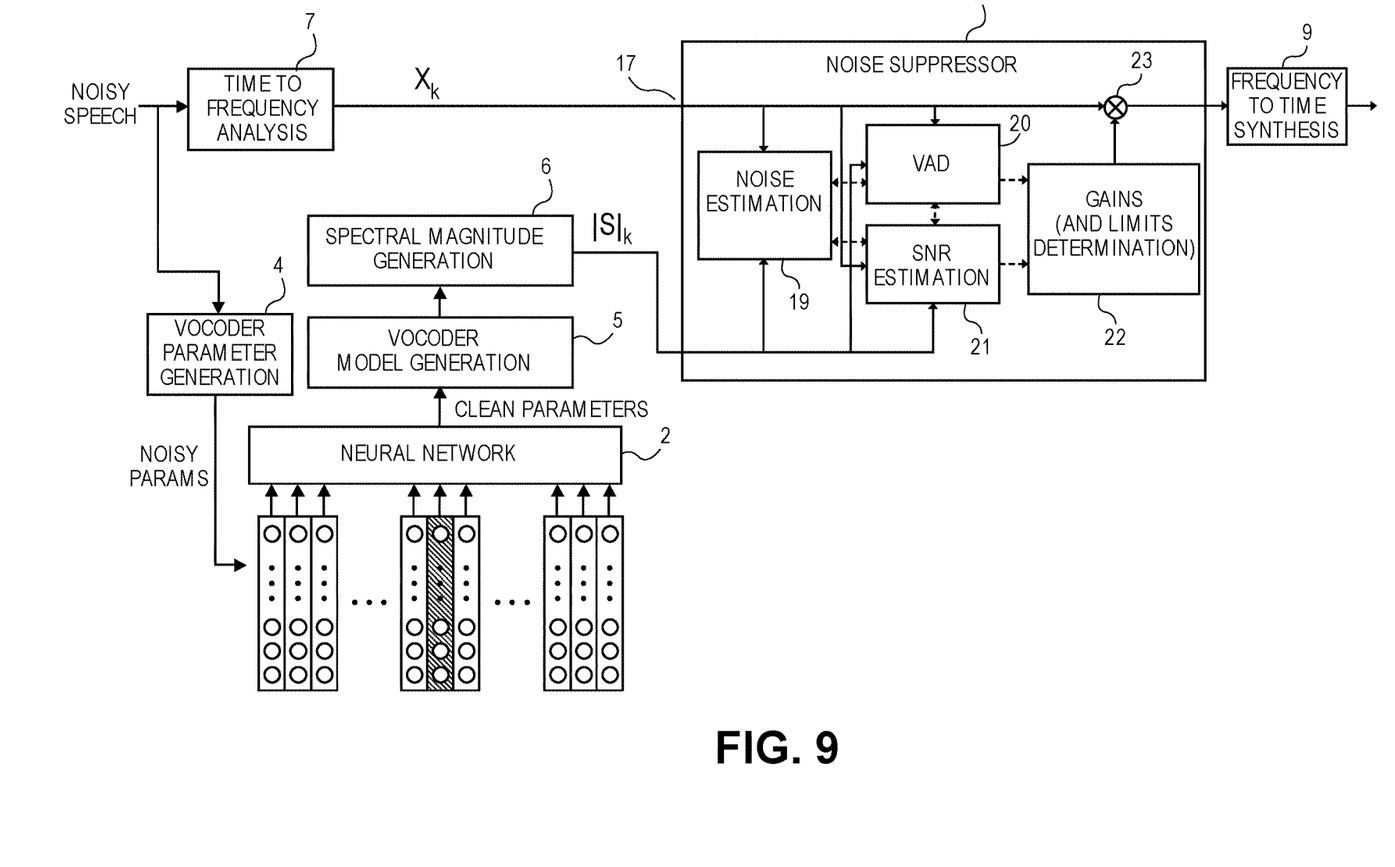
FIG. 9 is a block diagram of yet another embodiment of the digital speech signal enhancer.

Another embodiment of the invention (as a digital speech signal enhancer) is depicted in FIG. 9. This uses noise suppression principles to enhance the speech, where the noise suppression process is itself enhanced by use of the neural network 2. Some aspects of this embodiment are similar to FIG. 1 and FIG. 3, e.g., a speech coding parameter generator (vocoder parameter generation 4) that is configured to process or encode the noisy speech into noisy parameters, the neural network 2 that produces clean speech coding parameters, a speech coding model generator (vocoder model generation 5) that derives formant information, pitch information, or both from the clean parameters, and the spectral magnitude generator (spectral magnitude generation 6) which is configured to process the formant information, pitch information, or both, into estimated clean speech spectral magnitudes |S|k, or "refined" estimated clean speech spectral magnitudes |T|k. In this embodiment however, the estimated clean speech spectral magnitudes, |S|k or|T|k, are used in a sense as a refined input to a conventional noise estimator or noise estimation process (noise estimation 19), a signal to noise ratio, SNR, estimator (SNR estimation 21), or a voice activity detector (VAD 20.) These may be part of a noise suppressor 16 that may have a main suppressor input 16 that receives the original frequency spectrum Xk of the input speech sequence (noisy speech), and a speech estimation input 18 that receives the |S|k or |T|k.

In one embodiment, the noise estimation 19 (as part of the noise suppressor 16) is a minimal tracking estimator that looks at a smoothed, voice activity gated update of tracking of minimal energy of Xk in each frequency bin. It is configured to estimate (in the spectral or frequency domain) the stationary noise that is present in the original frequency spectrum Xk. The noise estimate may be used as a first input (noise dominant input) to the SNR estimation 21, while a second input (speech dominant input) to the SNR estimation 21 are the Xk. The SNR estimation 21 may use these twin inputs to compute an SNR value for each frequency bin of interest in Xk. These SNR values may then be used by the gains (and limits) determination 22 to determine the gain reduction or gain adjustment value that is applied (by the multiplier 23) to each frequency bin in Xk.

In another embodiment, the noise estimation 19 is configured to estimate the noise that is present in the difference between i) the original frequency spectrum Xk of the input speech sequence and ii) a scaled version of the estimated clean speech spectral magnitudes, |S|k or |T|k. This is an example of effectively removing some of the speech proactively, before the noise estimation process.

In another instance, the noise estimate may be used as a first input to the VAD 20, while a second input to the VAD 20 are the estimate clean speech spectral magnitudes, |S|k or |T|k. The VAD 20 may use these twin inputs to make a binary decision (speech vs. non-speech) upon each frequency bin of interest in Xk. This binary decision may then be used by gains (and limits) determination 22 to determine the gain reduction or gain adjustment value that is applied to each frequency bin in Xk by a multiplier 23. In this instance, the SNR estimation 21 may not be needed (as part of the noise suppressor 16.)

In both of the above instances, the noise suppressor 16 thus reduces gains in the original frequency spectrum Xk in accordance with the estimated noise, to produce an enhanced frequency spectrum as its output speech sequence, at the output of the multiplier 23, that may then be converted into time domain by an inverse transform block (the frequency to time synthesis 9.) These approaches are in contrast to the techniques of modifying the spectral magnitudes Xk of the noisy speech as in FIG. 1 and in FIG. 3, and configuring a speech synthesizer as in FIG. 7 and FIG. 8.

The following statement of invention may be made in the context of FIG. 9 as described above. A digital speech signal enhancer, comprising: a neural network processor trained to process a plurality of noisy, speech coding parameters that have been derived from an input speech sequence, to produce a plurality of clean speech coding parameters; a speech coding model generator configured to process the clean speech coding parameters into formant information, pitch information, or both; a spectral magnitude generator configured to process the formant information, pitch information, or both, into estimate clean speech spectral magnitudes; a noise suppressor having a noise estimator that estimates noise that is present in a difference between an original frequency spectrum of the input speech sequence and a scaled version of the estimated clean speech spectral magnitudes, wherein the noise suppressor reduces gains in the original frequency spectrum in accordance with the estimated noise and estimated SNR in each frequency bin to produce an enhanced frequency spectrum; and an inverse transform block configured to convert the enhanced frequency spectrum into time domain, as an output speech sequence.

The following statement of invention may be made in the context of FIG. 9 as described above. A digital speech signal enhancer, comprising: a neural network processor trained to process a plurality of noisy, speech coding parameters that have been derived from an input speech sequence, to produce a plurality of clean speech coding parameters; a speech coding model generator configured to process the clean speech coding parameters into formant information, pitch information, or both; a spectral magnitude generator configured to process the formant information, pitch information, or both, into estimate clean speech spectral magnitudes; a noise suppressor having a noise estimator that estimates noise that is present in a difference between an original frequency spectrum of the input speech sequence and a scaled version of the estimated clean speech spectral magnitudes, wherein the noise suppressor reduces gains in the original frequency spectrum in accordance with the estimated noise and estimated SNR in each frequency bin to produce an enhanced frequency spectrum; and an inverse transform block configured to convert the enhanced frequency spectrum into time domain, as an output speech sequence.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while FIG. 1 depicts the two elements of vocoder model generation 5 and spectral magnitude generation 6 as separate blocks coupled to each other in cascade (where the vocoder model generation 5 feeds the input of the spectral magnitude generation 6), in practice the functions of those two elements may not be separable such that a single digital signal processing routine or hardware block will produce the "enhanced" spectral magnitudes directly from the clean parameters provided by the neural network 2. The description is thus to be regarded as illustrative instead of limiting.

What is claimed is:

1. A digital speech signal enhancer, comprising:
a neural network processor to process a plurality of noisy speech coding parameters that have been derived from an input speech sequence by a vocoder implementing a linear predictive model using a time-varying model for formant or formant and pitch, to produce a plurality of estimated clean speech coding parameters;
a vocoder model generator and spectral magnitude generator, configured to process the estimated clean speech coding parameters into estimated clean speech spectral magnitudes;
a magnitude modifier configured to modify an original frequency spectrum of the input speech sequence using the estimated clean speech spectral magnitudes, to produce an enhanced frequency spectrum; and a synthesis block configured to convert the enhanced frequency spectrum into time domain, as an output speech sequence.

2. The speech signal enhancer of claim 1 wherein the noisy speech coding parameters are linear predictive parameters, or non-linear mappings of such linear predictive parameters to a Line Spectral Pairs domain or to a Log Area Ratios domain.

3. The speech signal enhancer of claim 2 wherein the noisy speech coding parameters are only formant type or short-term parameters, not long-term parameters.

4. The speech signal enhancer of claim 1 wherein the vocoder model generator is to process the estimated clean speech coding parameters into formant information, pitch information, or both, and the spectral magnitude generator is configured to process the formant information, pitch information, or both into the estimated clean speech spectral magnitudes.

5. The speech signal enhancer of claim 4 wherein the vocoder model generator is to process the estimated clean speech coding parameters into formant and pitch information which defines a formant filter for short-term prediction and a pitch filter for long-term prediction, and wherein the spectral magnitude generator computes a spectral envelope of a frequency response of a cascade of the formant and pitch filters.

6. The speech signal enhancer of claim 4 wherein the spectral magnitude generator is configured to evaluate the original frequency spectrum of the input speech sequence, when processing the formant information, pitch information, or both, into the estimated clean speech spectral magnitudes, to produce refined clean speech spectral magnitudes.

7. The speech signal enhancer of claim 6 wherein the spectral magnitude generator evaluates the original frequency spectrum of the input speech sequence by comparing a spectral valley in the original frequency spectrum to a spectral valley in the estimated clean speech spectral magnitudes, and scales the spectral valley in the estimated clean speech spectral magnitudes in accordance with the comparison, when producing the refined clean speech spectral magnitudes.

8. The speech signal enhancer of claim 6 wherein the spectral magnitude generator evaluates the original frequency spectrum of the input speech sequence by comparing a spectral peak in the original frequency spectrum to a spectral peak in the estimated clean speech spectral magnitudes, and scales the spectral peak in the estimated clean speech spectral magnitudes in accordance with the comparison, when producing the refined clean speech spectral magnitudes.

9. A digital speech signal enhancement process comprising:
processing using a neural network a plurality of noisy speech coding parameters that have been derived from an input speech sequence , by a vocoder implementing a linear predictive model using a time-varying model for formant or formant and pitch, to produce a plurality of estimated clean speech coding parameters;
processing the estimated clean speech coding parameters into estimated clean speech spectral magnitudes;
modifying an original frequency spectrum of the input speech sequence using the estimated clean speech spectral magnitudes, to produce an enhanced frequency spectrum; and
converting the enhanced frequency spectrum into time domain, as an output speech sequence.

10. The process of claim 9 wherein the noisy speech coding parameters are formant type or short-term linear predictive parameters, not long-term linear predictive parameters.

11. The process of claim 9 wherein processing the estimated clean speech coding parameters into estimate clean speech spectral magnitudes comprises:
generating formant information, pitch information, or both; and
processing the formant information, pitch information, or both into the estimated clean speech spectral magnitudes.

12. The process of claim 9 further comprising evaluating the original frequency spectrum of the input speech sequence, when processing the formant information, pitch information, or both, into the estimated clean speech spectral magnitudes, to produce refined clean speech spectral magnitudes.

13. The process of claim 12 wherein evaluating the original frequency spectrum of the input speech sequence comprises:
comparing a spectral valley in the original frequency spectrum to a spectral valley in the estimated clean speech spectral magnitudes; and
scaling the spectral valley in the estimated clean speech spectral magnitudes in accordance with the comparison, when producing the refined clean speech spectral magnitudes.

14. The process of claim 12 wherein evaluating the original frequency spectrum of the input speech sequence comprises:
comparing a spectral peak in the original frequency spectrum to a spectral peak in the estimated clean speech spectral magnitudes; and
scaling the spectral peak in the estimated clean speech spectral magnitudes in accordance with the comparison, when producing the refined clean speech spectral magnitudes.

15. A digital speech signal enhancer comprising:
an artificial neural network to process a plurality of noisy speech coding parameters that have been derived from an input speech sequence by a vocoder implementing a linear predictive model using a time-varying model for formant or formant and pitch, to produce a plurality of clean speech coding parameters;
a speech coding model generator to process the clean speech coding parameters into formant information and pitch information;
a pitch filter configured in accordance with the pitch information; and
a formant filter configured in accordance with the formant information, wherein the pitch and formant filters are coupled in cascade to filter an input excitation signal and produce a synthesized speech signal.

16. The speech signal enhancer of claim 15 further comprising:
a linear predictive model generator to derive the formant information, or the formant and pitch information, and perceptual weighting information, from the input speech sequence; and
a linear prediction analysis filter to filter the input speech sequence to produce a perceptually weighted excitation signal that is filtered by the pitch and formant filters, wherein the linear prediction analysis filter is configured in accordance with the formant information or the formant and pitch information, and in accordance with the perceptual weighting information.

17. The speech signal enhancer of claim 16 further comprising an excitation modifier that is configured to
  transform the perceptually weighted excitation signal from time domain to frequency domain,
  modify spectral magnitudes of the perceptually weighted excitation signal in spectral domain, in accordance with the information from the linear predictive model generator, to produce a new weighted excitation signal, and then
  inverse transform the new weighted excitation signal from frequency domain to time domain, wherein the new weighted excitation signal in time domain is then filtered by the pitch and formant filters.

18. A digital speech signal enhancement process comprising:
  processing by an artificial neural network a plurality of noisy speech coding parameters that have been derived from an input speech sequence by a vocoder implementing a linear predictive model using a time-varying model for formant or formant and pitch, to produce a plurality of clean speech coding parameters;
  processing the clean speech coding parameters into formant information and pitch information in accordance with a linear predictive speech production model; and
  filtering an excitation signal in accordance with both the pitch information and the formant information to produce a synthesized speech signal.

19. The process of claim 18 further comprising:
  deriving a) the formant information, or both the formant and pitch information, and b) perceptual weighting information, from the input speech sequence, using the linear predictive speech production model; and
  filtering the input speech sequence in accordance with the derived formant information, or formant and pitch information, and the perceptual weighting information, to produce the excitation signal as a perceptually weighted excitation signal.

20. The process of claim 19 further comprising:
  transforming the perceptually weighted excitation signal from time domain to frequency domain;
  modifying spectral magnitudes of the perceptually weighted excitation signal in the frequency domain, in accordance with the derived formant information, or formant and pitch information, and the perceptual weighting information, to produce a new weighted excitation signal, and then
  inverse transforming the new weighted excitation signal from frequency domain to time domain, to produce the excitation signal.

21. The process of claim 19 wherein the plurality of noisy speech coding parameters are a nonlinear mapping of linear predictive parameters, that have been derived from the input speech sequence, to a Line Spectral Pairs domain or to a Log Area Ratios domain.

* * * * *